(12) United States Patent
Inoue et al.

(10) Patent No.: US 6,328,799 B1
(45) Date of Patent: Dec. 11, 2001

(54) COATING APPARATUS AND A METHOD OF ASSEMBLING THE SAME

(75) Inventors: Masahiro Inoue; Masashi Murate, both of Nagoya; Masahito Sakakibara, Okazaki; Junji Ito; Masaki Nakagawa, both of Takasago, all of (JP)

(73) Assignees: Toyota Jidosha Kabushiki Kaisha, Toyota; Kawasaki Jukogyo Kabushiki Kaisha, Kobe, both of (JP)

( * ) Notice: Subject to any disclaimer, the term of this patent is extended or adjusted under 35 U.S.C. 154(b) by 0 days.

(21) Appl. No.: 09/433,289

(22) Filed: Nov. 3, 1999

(30) Foreign Application Priority Data

Nov. 13, 1998 (JP) .................................................. 10-323565

(51) Int. Cl.[7] .............................. B05B 12/00; B25J 9/06; B25J 18/02; B23P 11/00
(52) U.S. Cl. .............................. 118/323; 118/683; 29/428
(58) Field of Search ..................................... 118/669, 674, 118/410, 683, 692, 300, 323; 29/700, 592, 592.1, 1.1, 729, 564.5, 732, 259, 260, 261, 622, 428; 427/421

(56) References Cited

U.S. PATENT DOCUMENTS 4,822,647 * 4/1989 Nozaki et al. ........................ 427/421
5,096,392 * 3/1992 Griebel et al. ........................ 417/454
5,949,209 * 9/1999 Okamoto et al. ..................... 318/563

FOREIGN PATENT DOCUMENTS

| 60-54758 | 3/1985 | (JP) . |
|---|---|---|
| 63-88070 | 4/1988 | (JP) . |
| 5-92155 | 4/1993 | (JP) . |
| 6-72652 | * 10/1994 | (JP) . |
| 8-108114 | 4/1996 | (JP) . |
| 9-308848 | 12/1997 | (JP) . |
| 10-94985 | 4/1998 | (JP) . |

* cited by examiner

Primary Examiner—Richard Crispino
Assistant Examiner—Yewebdar T T.
(74) Attorney, Agent, or Firm—Pillsbury Winthrop LLP

(57) ABSTRACT

A coating apparatus includes (1) a robot including at least one movable portion, at least one motor for driving the movable portion, and at least one pressurized chamber in which the motor for driving the movable portion is disposed; and (2) a coating device including a coating gun, a paint feed pump and a motor for driving the paint feed pump, the coating device being mounted to the robot. The motor for driving the paint feed pump is disposed in the pressurized chamber.

7 Claims, 3 Drawing Sheets

COATING APPARATUS AND A METHOD OF ASSEMBLING THE SAME

BACKGROUND OF THE INVENTION

1. Field of the Invention

The present invention relates to coating apparatus and a method of assembling the same.

2. Description of Related Art

A conventional robot for use in a coating apparatus, as illustrated in FIG. 4, generally includes a swivel base 40, a first vertical arm 41 extending from the swivel base 40, a second arm 42 extending from the first arm 41 in a horizontal direction, and a wrist portion 43 which is coupled to a tip of the second arm 42 and is capable of holding the coating gun. The swivel base 40, the first arm 41, the second arm 42 and the wrist portion 43 are movable and are driven by independent motors. Since the coating apparatus is operated in an explosion-proof area, each motor is disposed in a pressurized chamber provided in the robot. The pressurized chamber is filled with high pressure air, which prevents air mixed with a thinner from entering the pressurized chamber from the outside.

Further, as illustrated in FIG. 4, since the robot is used for coating, a coating device including a color change valve assembly 45, a paint feed pump 46, a trigger/dump valve 47 are mounted to an outside surface of the robot via a bracket 44. A pressure-proof (explosion-proof) motor is used for driving the electrically-operated paint feed pump 46.

However, the pressure-proof motor is relatively large in size for its motor capacity. As a result, the robot is necessarily large-sized, which may cause interference between the robot and a workpiece.

SUMMARY OF THE INVENTION

An object of the present invention is to provide a coating apparatus which is not large-sized even though accommodated with an explosion-proof means and a method of assembling the same.

The above object can be achieved by the present invention, as follows.

A coating apparatus includes (a) a robot including a base, at least one movable portion, at least one motor for driving the movable portion, and at least one pressurized chamber in which the motor for driving the movable portion is disposed, and (b) a coating device including a coating gun, a paint feed pump, and a motor for driving the paint feed pump, the coating device being mounted to the robot. The motor for driving the paint feed pump is disposed in the pressurized chamber.

The at least one movable portion includes a swivel base mounted on the base, an arm portion provided with the pressurized chamber, and a wrist portion which is coupled to a tip of said arm portion and is capable of holding the coating gun. The coating gun is coupled to the wrist portion, the paint feed pump is mounted to the arm portion, and the motor for driving the paint feed pump is disposed in the pressurized chamber provided in the arm portion.

The arm portion includes a first arm extending from the swivel base mounted on the base and a second arm coupled to an upper end of the first arm, the second arm being provided with the pressurized chamber and having a tip to which the wrist portion is coupled. The motor for driving the paint feed pump is mounted to the second arm, and the motor for driving the paint feed pump and a motor for driving the wrist portion are disposed in the pressurized chamber provided in the second arm.

A method of assembling the coating apparatus includes a step of disposing the motor for driving the wrist portion and the motor for driving the paint feed pump within the pressurized chamber when said robot is assembled.

In the method, the coating device except the coating gun is mounted to the robot when said robot is assembled, and then the coating gun is coupled to the wrist portion to be assembled into the coating apparatus.

In the aforementioned coating apparatus and the assembly method, since the motor for driving the paint feed pump is disposed in the pressurized chamber provided in the robot, the motor is a pressurized motor which is explosion-proof. As a result, the motor is compact as compared with a conventional pressure-proof motor.

Further, in the aforementioned assembly method, since the motor for driving the paint feed pump, together with the motor for driving the wrist portion, is disposed in the pressurized chamber provided in the second arm of the robot at the time of assembling the robot, the motor for driving the paint feed pump is a pressurized motor like the motor for driving the wrist portion. As a result, assembling the coating apparatus can be performed effectively, as compared with a conventional method where the pressure-proof motor for driving a paint feed pump is mounted to an outside surface of a robot.

Furthermore, in the aforementioned assembly method, since the coating device except the coating gun is mounted to the robot at the same time during assembly, the coating apparatus except the coating gun can be assembled in a single step thereby improving productivity, as compared with a conventional method where a robot and a coating device are assembled separately.

BRIEF DESCRIPTION OF THE DRAWINGS

The objects, features, and advantages of the present invention will become more apparent and will more readily be appreciated by the following detailed description of the preferred embodiments illustrated by the accompanying drawings, in which.

DETAILED DESCRIPTION OF THE PREFERRED EMBODIMENTS

Figure 1:
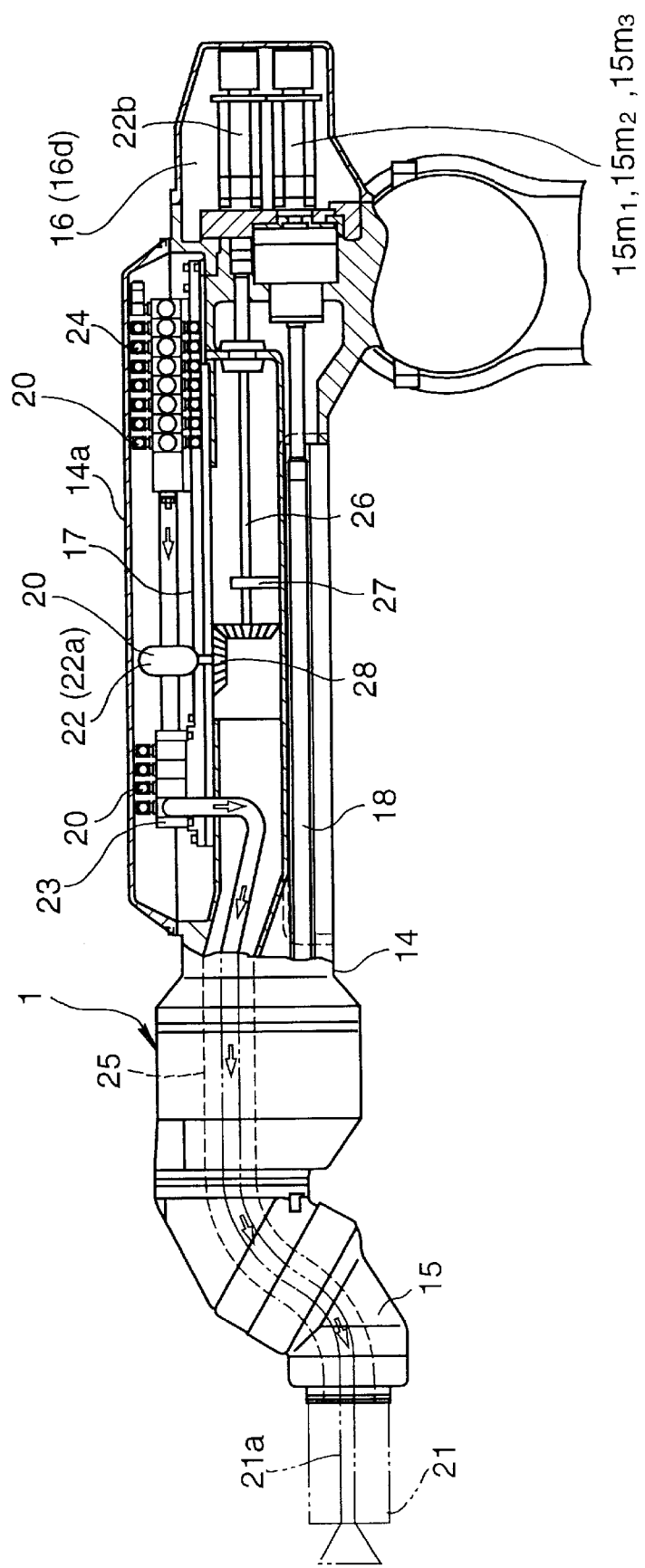
FIG. 1 is a cross-sectional view of a second arm of a coating apparatus according to an embodiment of the present invention.

A coating apparatus according to an embodiment of the present invention will be explained with reference to FIGS. 1–3.

The coating apparatus 1 includes a robot 10 and a coating device 20 mounted to the robot 10. The robot 10 includes movable portions 12–15, motors $12m$–$15m_3$, for driving the movable portions and a pressurized chamber 16 in which the motors $12m$–$15m_3$ are disposed. The coating device 20 includes a coating gun 21, a paint feed pump 22a and a motor 22b for driving the paint feed pump 22a. In the coating apparatus 1, the motor 22b for driving the paint feed pump is disposed in the pressurized chamber 16 of the robot 10.

The robot 10 includes a swivel base 12 mounted on a base 11, arm portions 13, 14 extending from the swivel base 12, and a wrist portion 15 which is coupled to a tip of the arm portions 13, 14 and is capable of holding a coating gun 21. The swivel base 12, the arm portions 13, 14, and the wrist portion 15 constitute movable portions.

The arm portions include a first arm 13 extending upwardly from the swivel base 12, and a second arm 14 coupled to the first arm 13. The second arm 14 extends in a direction perpendicular to the first arm 13. The first arm 13 and the second arm 14 include spaces therein, respectively.

An upper wall (an upper cover) 14a located in an axially central portion of the second arm 14 protrudes radially from outside walls of a front end portion and a rear end portion of the second arm 14, so that the space in the central portion is relatively large. The upper cover 14a is removable from the central portion. An inner plate 17 is disposed in the space in the central portion so as to partition the space into two chambers, i.e., an upper chamber and a lower chamber.

The wrist portion 15 is coupled to the tip of the second arm 14, and the coating gun, such as a rotary atomizing coating gun and a rotary atomizing electrostatic coating gun, can be connected and disconnected to the wrist portion 15.

In a case where the robot 10 is a multi-axis robot, for example, a six-axis robot, the swivel base 12 is rotated about an axis A by a motor 12m for driving the swivel base. The first arm 13 is oscillated about an axis B by a motor 13m for driving the first arm. The second arm 14 is oscillated about an axis C by a motor 14m for driving the second arm. The wrist portion 15 is rotated about axes D, E and F by respective motors $15m_1$, $15m_2$ and $15m_3$ for driving the wrist portion.

Each motor 12m, 13m, 14m, $15m_1$, $15m_2$ and $15m_3$ is arranged in the pressurized chamber 16 provided in the robot 10. The pressurized chambers 16 is partitioned from the remaining portions by a partition wall. The motor 12m for driving the swivel base is provided to the partition wall defining a pressurized chamber 16a in the swivel base 12, and is disposed in the pressurized chamber 16a. The motor 13m for driving the first arm is provided to the partition wall defining a pressurized chamber 16b in a lower end portion of the first arm 13, and is disposed in the pressurized chamber 16b. The motor 14m for driving the second arm is provided to the partition wall defining a pressurized chamber 16c in an upper end portion of the first arm 13, and is disposed in the pressurized chamber 16c. The motors $15m_1$, $15m_2$ and $15m_3$ are provided to a partition wall defining a pressurized chamber 16d in the rear end portion of the second arm 14, and are disposed in the pressurized chamber 16d in parallel to each other.

The respective pressurized chambers 16a, 16b, 16c and 16d are supplied with air having a pressure higher than an atmospheric pressure, for example about 3Pa, through an air supply hose (not shown) so as to prevent inflammable gas and explosive gas from entering the pressurized chamber. Gas supplied to the pressurized chamber may not be exhausted. Alternatively, gas supplied into the pressurized chamber may be exhausted through an exhaust hose communicating with the pressurized chamber. In that case, the flow of supply and exhaust air is adjusted to a predetermined value.

Figure 3:
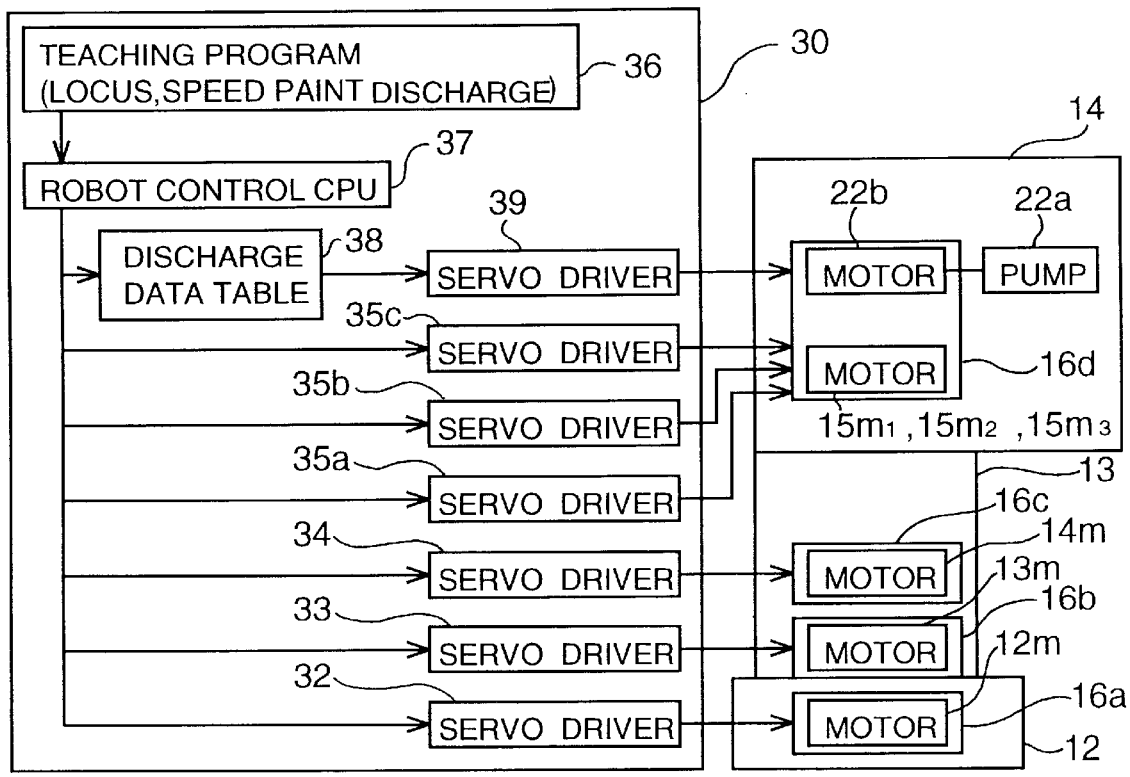
FIG. 3 is a general block diagram illustrating of a control system for the coating apparatus according to the embodiment of the present invention.
Figure 4:
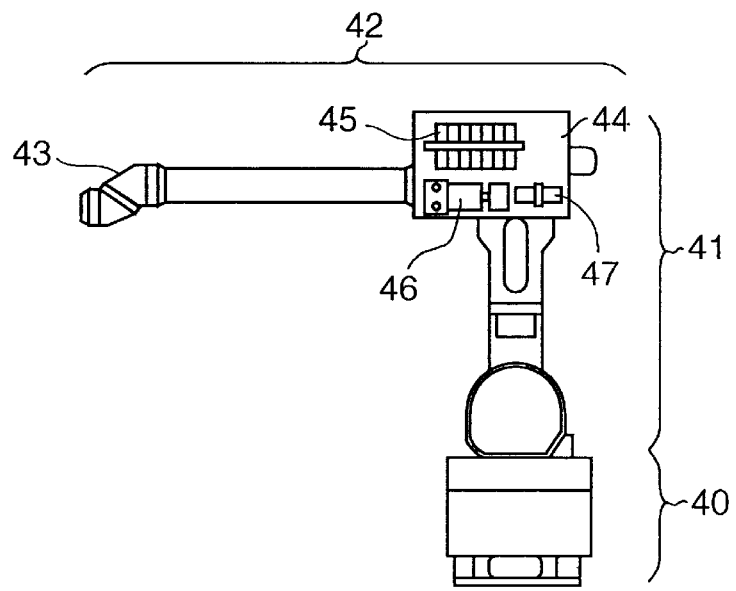
FIG. 4 is a side view of a conventional coating apparatus.

The respective motors 12m, 13m, 14m, $15m_1$, $15m_2$ and $15m_3$ are controlled and driven by a robot control panel 30, as shown in FIG. 3. Servo drivers 32, 33, 34, 35a, 35b, 35c for driving the respective motors 12m, 13m, 14m, $15m_1$, $15m_2$ and $15m_3$, and a robot control CPU (Central Processing Unit) 37 are housed in the robot control panel 30. The robot control CPU 37 processes input data 36 and issues operation instructions (digital signals) to the servo drivers 32, 33, 34, 35a, 36b and 35c.

The coating device 20 mounted to the robot 10 includes a coating gun 21, and a paint feed pump assembly 22 which includes a paint feed pump 22a and the motor 22b for driving the paint feed pump. The coating device 20 further includes a trigger/dump valve 23, a color change valve assembly 24, and a paint feed hose 25.

The coating gun 21 includes a paint nozzle 21a which can communicate with the paint feed hose 25 disposed in the robot 10.

The paint feed pump 22a is driven by the motor 22b so that the paint feed pump assembly 22 feeds a constant quantity of paint. The motor 22b for driving the paint feed pump is driven by a servo driver 39 housed in the robot control panel 30. A flushable gear pump (FGP), which can be self-cleaned, may be used as the paint feed pump 22a.

The trigger/dump valve 23 includes a trigger valve which permits a paint and the like to flow into a paint hose communicating with the coating gun 21 and a dump valve which permits the paint and the like to flow into a recycling path.

The color change valve assembly 24 includes a plurality of paint valves for switching ON/OFF of paint supply from respective paint paths extending from paint tanks (not shown) corresponding to paint colors to be coated, a thinner valve for switching ON/OFF of thinner supply, and an air valve for switching ON/OFF of air supply.

The paint feed hose 25 extends from the color change valve assembly 24 and feeds paint to the coating gun 21. The paint feed hose 24 is provided with a FGP 22a and the trigger/dump valve 23 in its intermediate portion.

The color change valve assembly 24, the FGP 22a and the trigger/dump valve 23 are arranged in the second arm 14 of the arm portions. However, it is to be understood that this is not the only arrangement possible. Preferably, the color change valve assembly 24, the FGP 22a and the trigger/dump valve 23 are arranged in that order from upstream in a flow direction of paint. The paint feed hose 25 is disposed between the color change valve assembly 24 and the FGP 22a, and between the FGP 22a and the trigger/dump valve 23.

Figure 2:
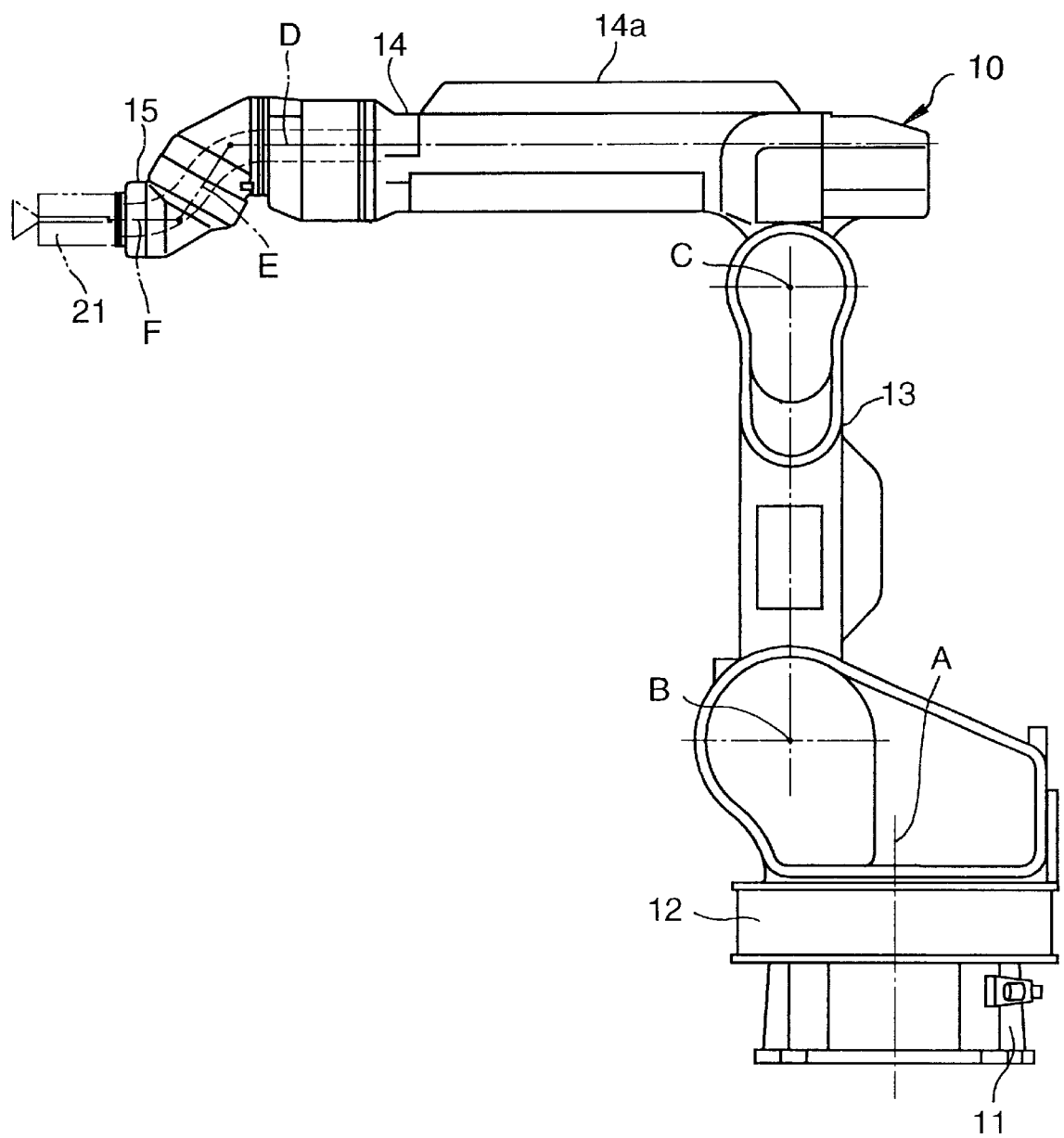
FIG. 2 is a side view of the coating apparatus according to the embodiment of the present invention.

Although the color change valve assembly 24, the FGP 22a, the trigger/dump valve 23 and the paint feed hose 25 may be mounted outside the second arm 14, it is preferable that, as illustrated in FIG. 1, they are disposed within the second arm 14 utilizing the space in the second arm 14. Due to this structure, paint mist is prevented from adhering to the coating device 20 during coating. In a case where the inner plate 17 is disposed in the second arm 14, the color change valve assembly 24, the FGP 22a and the trigger/dump valve 23 may be disposed on an upper surface of the inner plate 17. Preferably, the color change valve assembly 24, the FGP 22a and the trigger/dump valve 23 are arranged parallel to each other in the axial direction.

The motor 22b for driving the FGP is disposed in the pressurized chamber 16 provided in the robot 10. In the embodiment of the present invention, the motor 22b for driving the FGP is provided to the partition wall of the pressurized chamber 16d which has previously been formed in the rear end portion of the second arm 14 for arrangement of the motors $15m_1$, $15m_2$ and $15m_3$ for driving the wrist portion, and is disposed in the pressurized chamber 16d, together with the motors $15m_1$, $15m_2$ and $15m_3$ for driving the wrist portion. The motors $15m_1$, $15m_2$ and $15m_3$ for driving the wrist portion are disposed in a lower portion of the pressurized chamber 16d, and the motor 22b for driving the FGP is disposed in an upper portion of the pressurized chamber 16d.

The motor 22b for driving the FGP is controlled by the servo driver 39 housed in the robot control panel 30. A paint discharge level according to computer program is compared with a value on a paint discharge data table 38 and the instructions (digital signals) are fed to the servo driver 39. The discharge data table 38 determines paint discharge quantity according to a color to be coated and the paint discharge level.

Three power shafts 18 connected to the motors $15m_1$, $15m_2$ and $15m_3$ for driving the wrist portion and transmitting power to the wrist portion 15 are disposed in the space in the second arm 14.

In a case where the inner plate 17 is disposed inside the second arm 14, and the color change valve assembly 24, the paint feed pump 22a and the trigger/dump valve 23 are disposed in the upper chamber located in an upper side of the inner plate 17, the power shafts 18 are disposed in the lower chamber located in a lower side of the inner plate 17.

A power shaft 26 coupled to the motor 22b for driving the FGP and transmitting power to the FGP 22a is disposed in the space in the second arm 14. In a case where the inner plate 17 is disposed inside the second arm 14 and the coating device 20 is disposed in the upper chamber located in the upper side of the inner plate 17, the power shaft 26 is disposed in the lower chamber located in the lower side of the inner plate 17 at a position where the power shaft 26 does not interfere with the power shafts 18, for example, at a position located above the power shaft 18. A front portion of the power shaft 26 is supported by a bearing 27. A tip of the power shaft 26 is constructed of, for example, a bevel gear 28, through which power is transmitted to the FGP 22a located above the power shaft 26. Transmission of power from the motor 22b to the FGP 22a is not limited to the above-described means and may be performed by a flexible shaft.

Next, a case where coating is conducted using the aforementioned coating apparatus 1 will be explained.

In the case where coating is conducted using the coating apparatus 1, a robot locus, a robot speed and a paint discharge corresponding to a configuration of a workpiece are optionally fed to the robot control CPU 37 housed in the robot control panel 30. Then, operation instructions are fed from the robot control CPU 37 to the respective servo drivers 32, 33, 34, 35a, 35b and 35c for driving the respective motors 12m, 13m, 14m, $15m_1$, $15m_2$ and $15m_3$ for driving the respective movable portions 12, 13, 14 and 15. Also, operation instructions are fed from the robot control CPU 37 to the servo driver 39 for driving the motor 22b via the discharge data table 38. This causes any movable portion of the movable portions 12, 13, 14 and 15 receiving operation instructions to be driven. Further, by driving the motor 22b for driving the FGP 22a to supply a predetermined amount of paint, paint is caused to flow into the paint hose 25 toward the coating gun 21, so that the predetermined amount of paint is discharged from the coating gun 21 which is moved to a desired position relative to a workpiece and coating is thus conducted. When the FGP 22a is driven, the color change valve of the color change valve assembly 24 corresponding to a desired color is turned ON and the dump valve of the trigger/dump valve 23 is turned OFF.

When the paint color is to be changed, the thinner valve and the air valve is alternately switched ON, which allows thinner and air to flow into the paint feed hose 25 and the FGP 22a, respectively, so as to clean them. When the dump valve of the trigger/dump valve 23 is turned ON, the paint and the thinner flowing from an upstream direction flow into the recycling path.

In the coating apparatus 1, since the motor 22b for driving the FGP, which is a pressurized motor, is disposed in the pressurized chamber 16, the motor 22b for driving the FGP is compact as compared with the conventional FGP of a pressure-proof motor. As a result, the coating apparatus can be compact.

Further, since the pressurized motor is lighter in weight than the pressure-proof motor, the coating apparatus 1 is lightened, so that the capacity of each motor for driving the respective movable portions of the robot can be reduced.

In a case where the color change valve assembly 24, the FGP 22a and the trigger/dump valve 23 are disposed in the arm portion, paint mist is prevented from adhering to the color change valve assembly 24, the FGP 22a and the trigger/dump valve 23; thereby preventing coating defects caused when the adhesive paint mist is dropped on the workpiece. Even if the paint mist adheres to the arm portion, since a surface of the arm portion does not have a complicated configuration as compared with the case where the coating device is mounted outside the robot, cleaning is easy, and the adhesive paint mist can be removed easily.

Further, in a case where the color change valve assembly 24, the FGP 22a and the trigger/dump valve 23 are arranged in that order from upstream in a flow direction of paint so as to be spaced from each other over a relatively short distance, the paint feed hose 25 extending from the color change valve assembly 24 to the coating gun 21 coupled to the tip of the wrist portion 15 is shortened, so that the amount of paint to be dumped can be reduced when the paint color is changed. In a case where the color change valve assembly 24, the FGP 22a and the trigger/dump valve 23 are arranged on the same plane in that order from upstream in a flow direction of paint, the amount of paint to be dumped can be further reduced.

Furthermore, the servo driver 39 driving the motor for driving the paint feed pump is housed in the robot control panel 30, so that the servo driver 39 is controlled by digital signals. As a result, the control system is more simplified than a coating apparatus provided with the conventional paint feed pump in which the servo driver for the motor driving the paint feed pump is not housed in the robot control panel and a digital to analog conversion device is necessary.

Next, a method of assembling the coating apparatus of the present invention will be explained.

Generally, in a case where the coating apparatus includes a six-axis robot, the base 11, the swivel base 12, the first arm 13, the second arm 14 and the wrist portion 15 are assembled into the robot 10. In the embodiment of the present invention, when the robot 10 is assembled, the motor 22b for driving the FGP is provided to the partition wall of the pressurized chamber 16d which has previously been formed for arrangement of the motors $15m_1$, $15m_2$ and $15m_3$ for driving the wrist portion, and is disposed in the pressurized chamber 16d together with the motors $15m_1$, $15m_2$ and $15m_3$ for driving the wrist portion.

Then, the color change valve assembly 24, the FGP 22a, the trigger/dump valve 23 and a paint feed hose 25 are provided to the second arm 14. In a case where the color change valve assembly 24, the FGP 22a and the trigger/dump valve 23 are disposed in the second arm 14, the inner plate 17 is disposed in a state that an upper cover 14a of the second arm 14 is demounted and the upper cover 14a is then mounted to the second arm 14. Thus. the second arm 14 mounted with the coating device except the coating gun is obtained.

Since the coating device 20 except the coating gun 21 is mounted to the robot 10 at the time of assembling the robot 10, the coating apparatus 1 in a state that the coating gun 21 is not coupled thereto is assembled by a robot maker. Then, the coating apparatus 1 in that state is sent to a user of the coating apparatus, by whom an optional coating gun 21 is coupled thereto, so that the coating apparatus is practically usable. Therefore, the method of the present invention provides a simple method for assembling the coating apparatus, as compared with a conventional assembly method including a plurality of steps where only a robot is assembled by a robot maker, and coating device is then mounted to the robot by a coating device maker to be assembled into a coating apparatus. Accordingly, assembling the coating apparatus can be performed effectively, and the productivity is improved.

According to the present invention, the following technical advantages are obtained.

First, since the motor for driving the paint feed pump is disposed in the pressurized chamber, a pressurized motor can be used. As a result, the motor is compact as compared with the conventional pressure-proof motor, which enables the coating apparatus to be compact.

Second, since the motor for driving the paint feed pump is disposed in the pressurized chamber together with the motor for driving the wrist portion at the time of assembling the robot, assembling the coating apparatus can be performed effectively, as compared with the conventional method where the pressure-proof motor for driving the paint feed pump is mounted outside the robot.

Finally, since the coating device except the coating gun is mounted to the robot at the same time of assembling the robot, the coating apparatus except the coating gun can be assembled at a single step thereby improving the productivity, as compared with the conventional method where the robot and the coating device are assembled separately.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A coating apparatus comprising:

a robot including a base, at least one movable portion, at least one motor for driving said at least one movable portion, and at least one pressurized chamber provided within an interior of said at least one movable portion, said at least one motor for driving said at least one movable portion being disposed within said at least one pressurized chamber; and a coating device including a coating gun, a paint feed pump, and a motor for driving said paint feed pump, said coating device being mounted to said robot;

wherein said motor for driving said paint feed pump is disposed in said at least one pressurized chamber.

2. A coating apparatus according to claim 1, wherein said at least one movable portion includes a swivel base mounted on said base, an arm portion provided with said at least one pressurized chamber and having a tip, and a wrist portion which is coupled to the tip of said arm portion and is capable of holding said coating gun, wherein said coating gun is coupled to said wrist portion, said paint feed pump is mounted to said arm portion, and said motor for driving said paint feed pump is disposed in said at least one pressurized chamber provided in said arm portion.

3. A coating apparatus according to claim 2, wherein said arm portion includes a first arm extending from said swivel base mounted on said base and having an upper end, and a second arm coupled to the upper end of said first arm, said second arm being provided with said at least one pressurized chamber and having a tip to which said wrist portion is coupled, wherein said motor for driving said paint feed pump is mounted to said second arm, and said motor for driving said paint feed pump and a motor for driving said wrist portion are disposed in said at least one pressurized chamber provided in said second arm.

4. A method of assembling a coating apparatus which includes (1) a robot having a base, a swivel base mounted on said base, a first arm extending from said swivel base, a second arm having a pressurized chamber within an interior thereof and said second arm being coupled to said first arm, and the wrist portion coupled to a tip of said second arm, and (2) a coating device including a coating gun, a paint feed pump, and a motor for driving said paint feed pump, said coating device being mounted to two said robot, said method comprising:

disposing a motor for driving said wrist portion and said motor for driving said paint feed pump within said pressurized chamber, when said robot is assembled.

5. A method of assembling a coating apparatus according to claim 4, further comprising:

mounting said coating device except said coating gun to said robot when said robot is assembled; and coupling said coating gun to said wrist portion to be assembled into said coating apparatus.

6. A coating apparatus according to claim 3, wherein said paint feed pump of said coating device is mounted outside said second arm.

7. A coating apparatus according to claim 3, wherein said paint feed pump is provided in said second arm.

* * * * *